(12) United States Patent
Guglhör et al.

(10) Patent No.: US 11,772,218 B2
(45) Date of Patent: Oct. 3, 2023

(54) METHOD FOR CONTROLLING A MECHANICAL JOINING OR FORMING PROCESS

(71) Applicant: Altas Copco IAS GmbH, Bretten-Goelshausen (DE)

(72) Inventors: Manuel Guglhör, Benediktbeuren (DE); Michael Ludsteck, Munich (DE)

(73) Assignee: Atlas Copco IAS GmbH, Bretten-Goelshausen (DE)

( * ) Notice: Subject to any disclaimer, the term of this patent is extended or adjusted under 35 U.S.C. 154(b) by 333 days.

(21) Appl. No.: 16/938,819

(22) Filed: Jul. 24, 2020

(65) Prior Publication Data
US 2021/0046559 A1    Feb. 18, 2021

(30) Foreign Application Priority Data
Aug. 1, 2019    (DE) .......................... 102019120863.7

(51) Int. Cl.
B23Q 5/26      (2006.01)
G01L 5/00      (2006.01)
G01L 3/00      (2006.01)

(52) U.S. Cl.
CPC .............. B23Q 5/266 (2013.01); G01L 3/00 (2013.01); G01L 5/00 (2013.01); B23B 2260/142 (2013.01); B23Q 2705/12 (2013.01); B23Q 2717/00 (2013.01); F15B 2211/3057 (2013.01); F15B 2211/6336 (2013.01)

(58) Field of Classification Search
CPC .......................... F15B 2211/3057; B21J 5/066
See application file for complete search history.

(56) References Cited

U.S. PATENT DOCUMENTS 4,628,499 A * 12/1986 Hammett ............ F15B 15/2861
                                                               700/282
4,819,543 A *  4/1989 Leinen ...................... G05D 3/20
                                                                91/363 R
4,901,625 A *  2/1990 Bussan ................ G05B 19/231
                                                               700/206

(Continued)

FOREIGN PATENT DOCUMENTS

AT        501 936 A1    12/2006
DE   10 2007 024 627 B3    1/2009

(Continued)

OTHER PUBLICATIONS

English translation of AT 501936 A1 (Year: 2008).*

(Continued)

*Primary Examiner* — Jacob J Cigna
(74) *Attorney, Agent, or Firm* — The Culbertson Group, P.C.

(57) ABSTRACT

Methods and devices for controlling a mechanical joining or forming process, in particular friction drilling in thin-walled materials, apply several reverse pulses acting on a process parameter to bring the course of an actual curve of the parameter more into line with the course of a predetermined nominal curve of the process parameter. The number and length of the reverse pulses and the length of the intervals between the pulses are determined as a function of at least one immediately detectable variable associated with the process parameter.

6 Claims, 3 Drawing Sheets

(56) References Cited

U.S. PATENT DOCUMENTS

| | | | | |
|---|---|---|---|---|
| 4,932,311 | A * | 6/1990 | Mibu | G05B 19/232 92/33 |
| 5,542,336 | A * | 8/1996 | Larkin | F15B 9/03 91/462 |
| 5,691,894 | A * | 11/1997 | Fukushima | F15B 21/087 91/196 |
| 6,003,428 | A * | 12/1999 | Mundie | F15B 11/10 91/465 |
| 6,705,199 | B2 * | 3/2004 | Liao | F15B 9/09 91/363 R |
| 7,076,314 | B2 * | 7/2006 | Saitou | G05B 17/02 318/560 |
| 7,210,394 | B2 * | 5/2007 | Yajima | F15B 11/044 60/368 |
| 8,301,307 | B2 * | 10/2012 | Paulus | F15B 21/087 700/282 |
| 2003/0056641 | A1 | 3/2003 | Liao et al. | |
| 2017/0072520 | A1 * | 3/2017 | Kroll | B23P 19/006 |
| 2020/0324503 | A1 | 10/2020 | Brunner et al. | |

FOREIGN PATENT DOCUMENTS

| | | | | |
|---|---|---|---|---|
| EP | 0 654 608 | A1 | 5/1995 | |
| EP | 1 036 942 | A2 | 9/2000 | |
| EP | 1 396 642 | A1 | 3/2004 | |
| EP | 1995021 | A2 | 11/2008 | |
| EP | 2644904 | A1 * | 10/2013 | ............ F15B 11/048 |
| EP | 2 954 973 | A1 | 12/2015 | |
| JP | 63176801 | A | 7/1988 | |
| JP | H08278161 | A | 10/1996 | |
| JP | 2008151184 | A | 7/2008 | |
| WO | WO-2010059107 | A1 * | 5/2010 | ............. F15B 11/06 |

OTHER PUBLICATIONS

Japanese Patent Office Action dated Sep. 17, 2021, in Japanese patent application No. 2020-129391.
China Patent Office Action dated Nov. 1, 2021, in China patent application No. 202010734021.1.
European patent application No. 20 188 447.5 extended European search report dated Jan. 29, 2021.

* cited by examiner

METHOD FOR CONTROLLING A MECHANICAL JOINING OR FORMING PROCESS

TECHNICAL FIELD OF THE INVENTION

The invention relates to a method for controlling a mechanical joining or forming process, in particular friction drilling in thin-walled materials. The invention also encompasses an apparatus for controlling a mechanical joining or forming process.

BACKGROUND OF THE INVENTION

Mechanical joining or forming methods are used in fields, such as for example automotive engineering, in which thermal, substance-to-substance joining methods (arc welding, resistance welding, soldering) are problematic. Thus, thermal joining techniques are out of the question in modern vehicle body construction when the lightweight materials to be joined are too heat-sensitive. This applies, for example, to many joints with hot-formed steels, aluminum alloys or fiber-reinforced composites, and in particular to heterogeneous joints of these materials.

In contrast to thermal joining techniques, such as in particular welding, mechanical, and thus cold, methods, such as in particular friction drilling, are not only less damaging to the material but also offer further advantages such as speed, one-sided accessibility, low maintenance and energy saving.

In such methods it is necessary to control or even to regulate the machining process according to the requirements.

For example, in a joining process, such as friction drilling, rotational speed and feed rate must be controlled according to the requirements in order to take into consideration placing the tip of the screw on the surface of a workpiece, piercing the workpiece with the screw and penetrating through the workpiece. Different, changing requirements necessarily arise here in the process in terms of feed force, feed distance and rotational speed.

Here, the parameters are usually monitored in order to guarantee a process within permissible tolerances. Thus, when a screw head meets the surface for example, therefore when a screw head touches the receiver receiving the screw, an unacceptably high torque is to be prevented from being applied to the screw beyond the point in time at which the screw head meets the surface (overtightening).

In order to prevent process parameters lying outside predetermined tolerances, tolerance ranges or tolerance envelopes, it is necessary in the state of the art, for example, to determine the exact location of the screw head relative to the receiver.

However, component tolerances to be taken into consideration mean that a reduction in the rotational speed in the machining process usually takes place earlier than is actually necessary. Accordingly, this results in an undesired increase in the cycle time.

In practice, monitoring the torque is also a possibility for detecting when the screw head meets the surface. However, monitoring the torque in this way is not suitable for controlling the shift in rotational speed in the case of conventional slow systems in order to prevent an unacceptably high torque from being applied.

The above-mentioned methods therefore do not permit quick-reacting control and require a relatively long cycle time during processing, or prove to be very time-consuming.

In DE 10 2007 024 627 A1 it was further proposed, for a method for joining or releasing a fastening means, to use a difference quotient $\Delta L/\Delta t$ or $\Delta L/\Delta \varphi$, thus the change in feed rate of the fastening means or the forward speed thereof as a function of its rotational movement, for the control.

However, such a method is heavily dependent on the geometry of the fastening means, wherein in particular a screw geometry without a calibration zone between tip and thread of the screw makes a detection of the change in the feed rate or in the forward speed as a function of its rotational movement difficult or even impossible.

SUMMARY OF THE INVENTION

An object of the invention is therefore to avoid the disadvantages and, in a simple manner, to make possible a highly precise machining process at the same time as a low cycle time. Furthermore, such a machining process is to be independent of the geometry of a fastening means.

Through the control according to the invention of a mechanical method or process which is cold in comparison with thermal, substance-to-substance joining methods, a highly precise machining process is guaranteed at the same time as a low cycle time. In addition, the control according to the invention can also be used for any desired geometry of a fastening means.

For this purpose, an actual curve of a process parameter, such as for example feed rate, feed force or contact pressure, is brought more into line with an (ideal) nominal curve of the process parameter by several reverse pulses acting on a non-motor-driven actuator, in particular fluid pressure-driven actuator such as, for example, a pneumatic cylinder (to generate the process parameter). Through the application of the reverse pulses, an otherwise slow control method with run-on time can be brought more into line with an ideal nominal curve more quickly.

The reverse pulses are effected in number and length (duration) as a function of at least one immediately detectable variable associated with the process parameter, such as for example force, distance, pressure, speed, torque, time, position, rotational speed, angle of rotation, reverse pulses or a combination thereof. As used in this disclosure and in the accompanying claims an "immediately detectable" variable is one in which may be detected essentially in real time in the course of the process being controlled, and without significant measurement or detection delay.

The term "pulse" is used in this disclosure and the accompanying claims to denote a signal of the introduction of a variable, whereas the "interval" is the pause between two pulses.

In some preferred embodiments of the invention, the reverse pulses are generated in a pneumatic cylinder through a buildup of pressure on the opposite side of the cylinder from a driving pressure. A cost-effective and widely used control means (pneumatic control) can hereby be used, and nevertheless a highly precise machining with a low cycle time can be guaranteed.

It is particularly advantageous that a control method according to the invention can also be used in already existing machining systems, in order to make possible a higher machining speed and/or machining quality.

In some embodiment of the invention, the actuation of a valve to build up pressure on the opposite side of the cylinder is effected in a pulsed manner by introducing pressurized gas from a source at preferably constant pressure for the duration of a pulse. The pressure pulse applied in this way to the opposite side of the cylinder from the drive side of the cylinder serves to work in opposition to the pressure applied on the drive side of the cylinder, typically though a suitable proportional control valve.

A valve used to produce the pressure pulses can be formed as a multi-port valve with the result that, in the intervals, not only is the path for the pressure supply closed, but the pressure on the opposite side of the cylinder can preferably be relieved (vented).

Of course, it is also possible within the scope of the present invention, however, to provide an additional outlet valve instead of a multi-port valve, with the result that, during a pulse, the pressure can be reduced (in a pulsed manner) for a desired duration. This makes an even quicker and more exact control of the actual curve possible in a simple manner.

In some embodiments of the invention, the arrangement of one or more valves controlling the pressure on the opposite side of the cylinder, in contrast to a proportional valve, only makes possible the discrete switch positions "open" and "closed" to generate the reverse pulses.

To generate the reverse pulses an apparatus according to the invention may include an evaluation and control device, which is formed such that it actuates the second valve (the valve controlling the opposite side of the actuator from the drive side) in a pulsed manner as a function of at least one immediately detectable variable associated with the process parameter, in order to adapt the course of the actual curve of the process parameter to, or bring it more into line with, the course of the predetermined nominal curve of the process parameter by means of several reverse pulses.

The at least one immediately detectable variable associated with the process parameter can be chosen from the variables force, distance, pressure, speed, torque, time, position, rotational speed, angle of rotation, reverse pulses or a combination thereof, with the result that a quick adaptation of the actual curve is made possible, in particular an undesired lagging or run-on of the control is prevented.

Such an apparatus according to the invention even makes it possible to regulate an actual curve of a process parameter around a predetermined nominal curve within narrow tolerances.

These and other advantages and features of the invention will be apparent from the following description of representative embodiments, considered along with the accompanying drawings.

DESCRIPTION OF REPRESENTATIVE EMBODIMENTS

Figure 1:
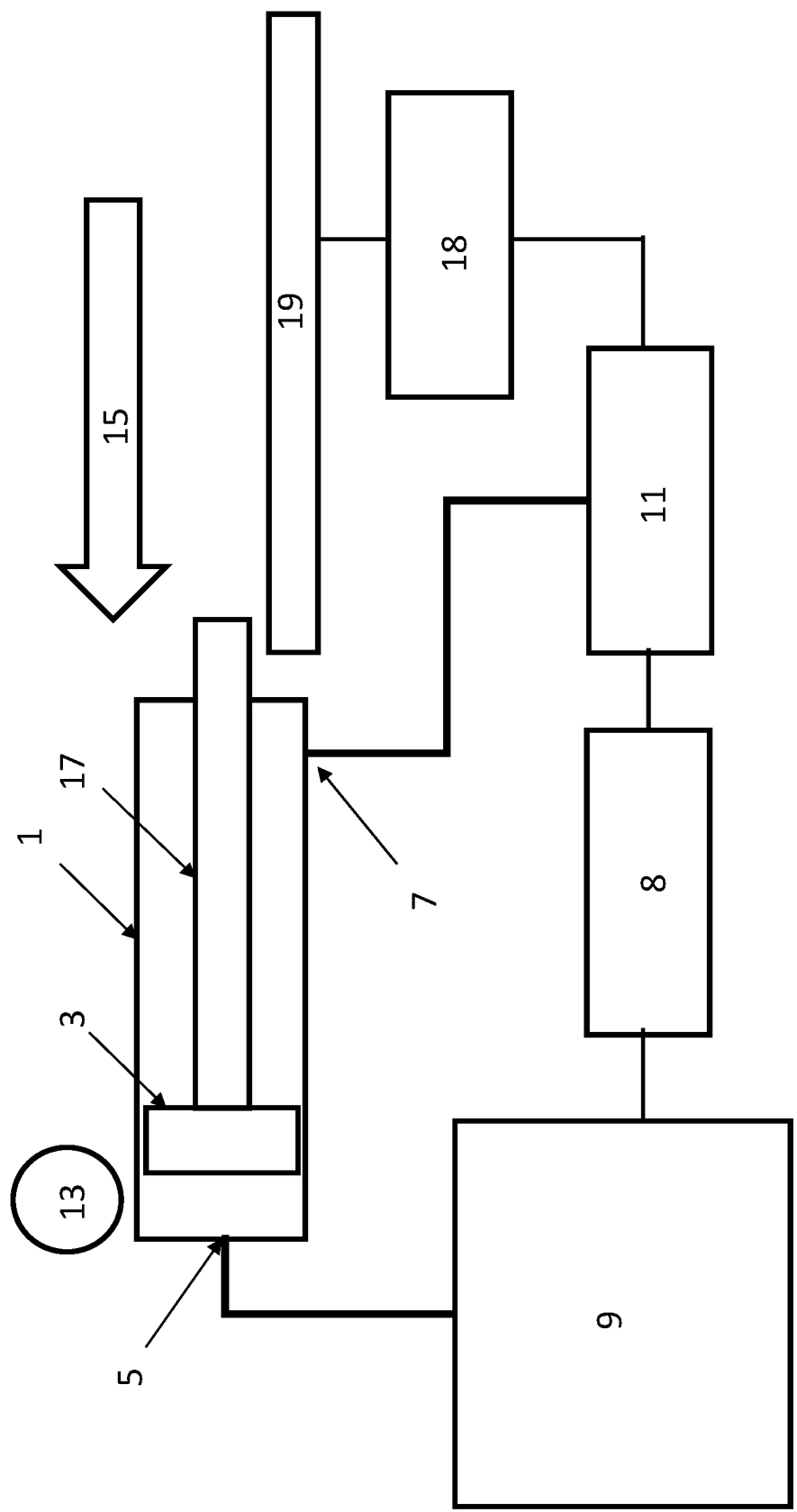
FIG. 1 is a schematic diagram of an apparatus for carrying out the method according to the invention.

The setup represented in FIG. 1 shows, by way of example, an apparatus for performing a method according to the invention for controlling a mechanical joining or forming process, in particular friction drilling.

For this purpose, the device has a pneumatic cylinder 1, the piston 3 of which is pressurized (gas or air) via a connection 5 on its front side, that is, its drive side to the left of the piston 3 in the orientation of FIG. 1. The pressure applied in cylinder 1 in the volume to the left of the left surface of piston 3 applies a force to the piston tending to move it to the right in the figure.

On the opposite side of the cylinder 1, the side to the right of the piston 3 there is a further connection 7, in order to generate a reverse pulse (counterpressure) on the opposite side of the cylinder 1 acting on the right surface of the piston 3 in opposition to the force applied from the pressure on the left side of piston 3.

The connection 5 is connected to a pressure source 8 in FIG. 1, wherein the pressure is regulated via a control valve 9 according to the desired requirements.

The connection 7 is in turn connected to pressure source 8, wherein the pressure for generating the opposing force in the form of pulses is controlled via a pneumatic valve 11 with the states "open" and "closed". Although the apparatus in FIG. 1 shows both valves 9 and 11 connected to the same pressure source 8, other embodiments may include separate pressure sources for each valve 9 and 11.

The pneumatic valve 11 can advantageously be formed as a 3-port valve, with the result that via it not only can be controlled to effect the buildup of pressure on the opposite side of the cylinder 1 to the right the piston 3, but also to effect the venting of that pressure to form the intervals between pulses.

At the cylinder 1, the pressure 13 and thus the force 15 to which the piston 3 and thus the component, in particular the friction drilling screw—not represented in more detail in the drawing—is exposed can be measured in a manner not represented in more detail.

At the cylinder 1 or piston 3 or piston rod 17, a distance measurement can also be carried out using a distance measurement device 19 in order additionally to monitor and/or to control the method according to the invention. In particular, an evaluation and control device such as that shown at 18 in FIG. 1 may be connected to receive distance measurement information from device 19 and/or other process variable measuring devices (not shown), and then control valve 11 based on that variable information.

Figure 2:
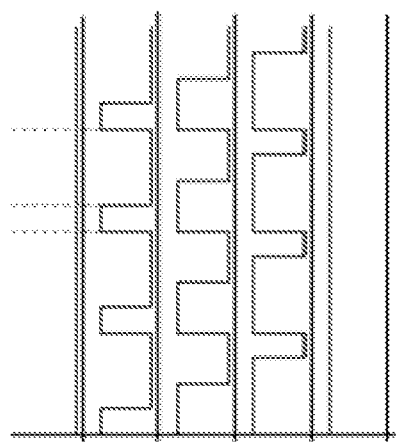
FIG. 2 is a diagram showing example reverse pulses which may be applied in accordance with the present invention.

FIG. 2 shows different types of example pulse sequences which the valve 11 may be controlled (opened and closed) to produce.

These pulse sequences exhibit uniform pulse lengths for the opening (buildup of pressure) and uniform intervals between the pulses for the closing or switching over to vent the valve 11.

Instead of uniform pulses and intervals it is of course also conceivable to vary the length of the pulses and intervals, if required.

In the following, a typical method procedure is explained with reference to the process of introducing a friction drilling screw into a workpiece.

Figure 3:
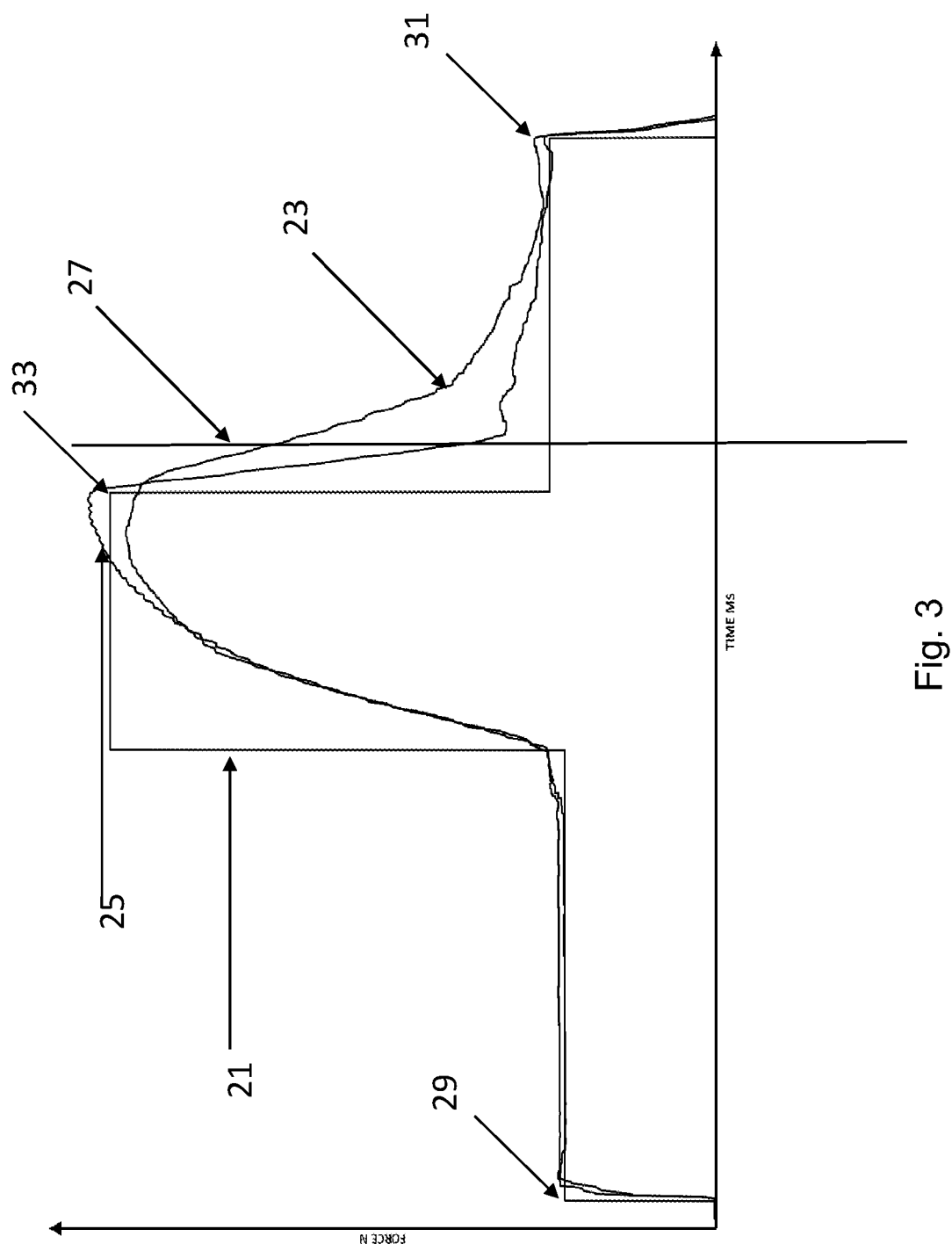
FIG. 3 a force-time graph of the course of a joining or forming process according to the invention.

The graph represented in FIG. 3 shows an ideal nominal curve 21 for the process of a friction drilling screw with force on the screw as a process parameter plotted against time for a total duration of, for example, 3000 ms.

Furthermore, in FIG. 3 a typical course 23 of the process without reverse pulses according to the invention is represented, as well as the course 25 of the process with the reverse pulses according to the invention.

At the start of the process (first perpendicular or almost perpendicular upward slope of the curves 21, 23 and 25), the screw is lying with its tip on the surface of the workpiece or of the material and a constant force (in the longitudinal direction of the screw) of, for example, 500 newtons (N) acts on it (in a rotating manner).

For this purpose, the valve 9 is correspondingly regulated in order to generate a pressure (for example 1 bar) on the front side (drive side) of the cylinder 1 producing this force.

If the tip of the screw pierces the material, an increased frictional force must be overcome. For this purpose, the valve 9 is correspondingly regulated until the desired force of, for example, 1000 N (or also 2000 N) is reached.

If the screw penetrates through the thin-walled material and, as a result of that, the thread is formed, the force has to decrease from the higher nominal force (1000 N to 2000 N) to a desired lower nominal force of, for example, 500 N (falling slope 33 in the nominal curve) and persist until a predefined (parametrizable) torque, in particular tightening torque, is reached and/or until the screw head meets the surface. When the screw head meets the surface and/or the predefined torque is reached, the process is ended 31 (last perpendicular or almost perpendicular falling slope of the curves 21, 23 and 25).

As can be seen from FIG. 3, the course 23 without reverse pulse is far away from the ideal course of the curve 21, particularly along portions adjacent to the falling slope 33. Thus, in the case of a process course without reverse pulse, the buildup of pressure must already be interrupted some time before a penetration (at falling slop 33 in nominal curve 21) in order that formation of the thread is made possible at all after the penetration 33, since otherwise a (feed) force that is too high acts on the friction drilling screw after the penetration 33.

In contrast, the curve 25 of the actual process with reverse pulses according to the invention can be brought even more into line with the ideal curve 21.

Thus, instead of being regulated down some time, for example 100 ms, before the penetration at falling slope 33 of the nominal curve 21, the valve 9 can be regulated down only after the actual penetration 33, since a stronger drop in the force is generated by a reverse pulse, for example of 80 ms duration, on the opposite side of the cylinder 1 or the opposite side of the piston 3 (to the right of piston 3 in the FIG. 1).

Before the reduced force desired for the formation of the thread is reached, this pulse (perpendicular line 27) is ended and the opposite side of the cylinder is vented for a short duration of a few milliseconds (ms) before a new, shorter reverse pulse is generated.

Through several such short reverse pulses, the actual curve 25 can be brought much more into line with the ideal curve 21 without falling below a minimum force, for example of 500 N, required for the formation of the thread in this area.

Of course, it is also conceivable, instead of forming the valve 11 as a 3-port valve, to provide an additional valve for the venting, with the result that venting can be effected not only in the intervals between two pulses.

It becomes clear, with reference to the above-mentioned example, that pulsed reverse pulses in a pneumatic system suppress the undesired run-on to the extent that a much quicker control and even a close approximation to an ideal nominal curve 21 or regulation around such a curve are made possible.

As becomes clear from the example explained above, the reverse pulses (thus opening of the valve 11 and buildup of pressure to generate an opposing force on the opposite side of the cylinder 1) can be coupled in number and length to further physical variables of a process (distance, speed, time, position, acceleration, pressure, force, torque, etc.), in order to achieve the optimum results depending on requirements.

Likewise, the length of the intervals between the pulses can be individually adapted to the requirements, in particular in order to enable a quick venting between the pulses.

When an additional valve is used for the venting (rather than venting through a vent port of a multi-port valve), the venting can also already be started before the end of a pulse, with the result that sawtooth-shaped pulses or even peak-like pulses (short peaks) are formed from rather rectangular pulses.

The length and number of the reverse pulses and of the intervals can optionally also be calculated in advance, for example from the downward slope of the force reduction combined with the difference in force parametrized in the program (forming a characteristic curve for the reverse pulse length and/or number as well as interval length between pulses).

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMBERS 1 pneumatic cylinder
3 piston
5 connection (front side)
7 further connection 8 pressure source
9 control valve
11 pneumatic valve
13 pressure measurement
15 force measurement
17 piston rod
18 evaluation and control device
19 distance measurement
21 nominal curve
23 course without reverse pulse
25 course with reverse pulse
27 perpendicular line
29 process start
31 process end
33 falling slope (penetration through the material)

The invention claimed is:

1. A method for controlling a mechanical joining or forming process comprising a friction drilling process in which a friction drilling screw is driven to penetrate through thin-walled materials, the method including:
   (a) applying a first fluid pressure to a pneumatic actuator to generate a process parameter over an actual course for the process parameter, the actual course for the process parameter corresponding over time with a nominal course for the process parameter wherein the nominal course for the process parameter includes a nominal process parameter change from a first nominal process parameter value to a second nominal process parameter value the nominal process parameter change corresponding to a point in the friction drilling process at which the friction drilling screw penetrates through the thin-walled materials;
   (b) while applying the first fluid pressure to generate the process parameter, applying a number of reverse pulses acting on the process parameter in opposition to the first fluid pressure at least over a portion of the actual course for the process parameter corresponding in time to a portion of the nominal course for the process parameter which encompasses the nominal process parameter change and also continues after the nominal process parameter change; and
   (c) wherein the number and length of the reverse pulses and the length of the intervals between the reverse pulses are determined as a function of at least one immediately detectable variable associated with the process parameter.

2. The method of claim 1 wherein the at least one immediately detectable variable associated with the process parameter is chosen from the variables force, distance, pressure, speed, torque, time, position, rotational speed, angle of rotation, and combinations thereof.

3. The method of claim 1 wherein:
   (a) the pneumatic actuator includes a pneumatic cylinder and piston with the first fluid pressure applied to a first side of the piston; and
   (b) the reverse pulses are generated in the pneumatic cylinder through a buildup of pressure on a second side of the piston, opposite to the first side of the piston.

4. The method of claim 3 further including for each respective reverse pulse, actuating a valve connected to the pneumatic cylinder on the second side of the piston to generate the respective reverse pulse by introducing pressurized gas into the pneumatic cylinder on the second side of the piston for the duration of the respective reverse pulse.

5. The method of claim 3 further including opening an outlet valve connected to the pneumatic cylinder on the second side of the piston to relieve the pressure built up for a respective reverse pulse, the outlet valve being opened in a pulsed manner to relieve the pressure.

6. The method of claim 3 further including, during the interval between each respective adjacent pair of reverse pulses, venting pressure from the pneumatic cylinder on the second side of the piston.

* * * * *